(12) United States Patent
Bååth et al.

(10) Patent No.: US 10,974,577 B2
(45) Date of Patent: Apr. 13, 2021

(54) BREAK-OUT ELEMENT FOR A MODULE SUPPORT, WHICH IS DESIGNED AS A WET/DRY AREA SEPARATION, OF A DOOR OR FLAP OF A MOTOR VEHICLE

(71) Applicant: BROSE FAHRZEUGTEILE GMBH & CO. KG, BAMBERG, Bamberg (DE)

(72) Inventors: Magnus Bååth, Partille (SE); Peter Thelin, Gothenburg (SE)

(73) Assignee: Brose Fahrzeugteile GmbH & Co. Kommanditgesellschaft, Bamberg, Bamberg (DE)

( * ) Notice: Subject to any disclaimer, the term of this patent is extended or adjusted under 35 U.S.C. 154(b) by 110 days.

(21) Appl. No.: 16/342,112

(22) PCT Filed: Jul. 17, 2017

(86) PCT No.: PCT/EP2017/067997
§ 371 (c)(1),
(2) Date: Apr. 15, 2019

(87) PCT Pub. No.: WO2018/015333
PCT Pub. Date: Jan. 25, 2018

(65) Prior Publication Data
US 2019/0337363 A1 Nov. 7, 2019

(30) Foreign Application Priority Data
Jul. 21, 2016 (DE) .......................... 102016008728.5

(51) Int. Cl.
*B60J 5/04* (2006.01)
*B60R 13/02* (2006.01)

(52) U.S. Cl.
CPC .......... *B60J 5/0416* (2013.01); *B60J 5/0418* (2013.01); *B60R 13/02* (2013.01)

(58) Field of Classification Search
CPC ........ B60J 5/0416; B60J 5/0418; B60R 13/02
USPC ........ 296/146.7, 152; 49/501, 502; 188/371, 188/376
See application file for complete search history.

(56) References Cited

U.S. PATENT DOCUMENTS

| | | | |
|---|---|---|---|
| 6,449,907 B2 * | 9/2002 | Nishikawa | B60J 5/0416 296/146.7 |
| 2013/0154304 A1 * | 6/2013 | Tobey | B60R 21/0428 296/146.7 |

FOREIGN PATENT DOCUMENTS

| | | |
|---|---|---|
| DE | 19824130 A1 | 12/1999 |
| DE | 202004020237 U1 | 3/2005 |
| DE | 10360794 A1 | 8/2005 |
| DE | 102005033116 A1 | 1/2007 |
| DE | 102011116134 A1 | 4/2013 |

(Continued)

*Primary Examiner* — Dennis H Pedder
(74) *Attorney, Agent, or Firm* — Lewis Roca Rothgerber Christie LLP

(57) ABSTRACT

It is provided a break-out element for a module support, which is designed as a wet/dry area separation, of a door or flap of a motor vehicle, wherein the break-out element is integrally connected to the adjacent material of the module support via at least one region of weakness of lesser material thickness, and wherein the region of weakness acts as a predetermined breaking point and forms at least part of the edge of an access opening. The break-out element is in the shape of a cup, wherein the region of weakness is arranged between the free edge of an edge-side cup ring and the base of the cup.

8 Claims, 4 Drawing Sheets

(56) References Cited

FOREIGN PATENT DOCUMENTS

EP 1677012 B1 12/2006
GB 2090318 A 7/1982

* cited by examiner

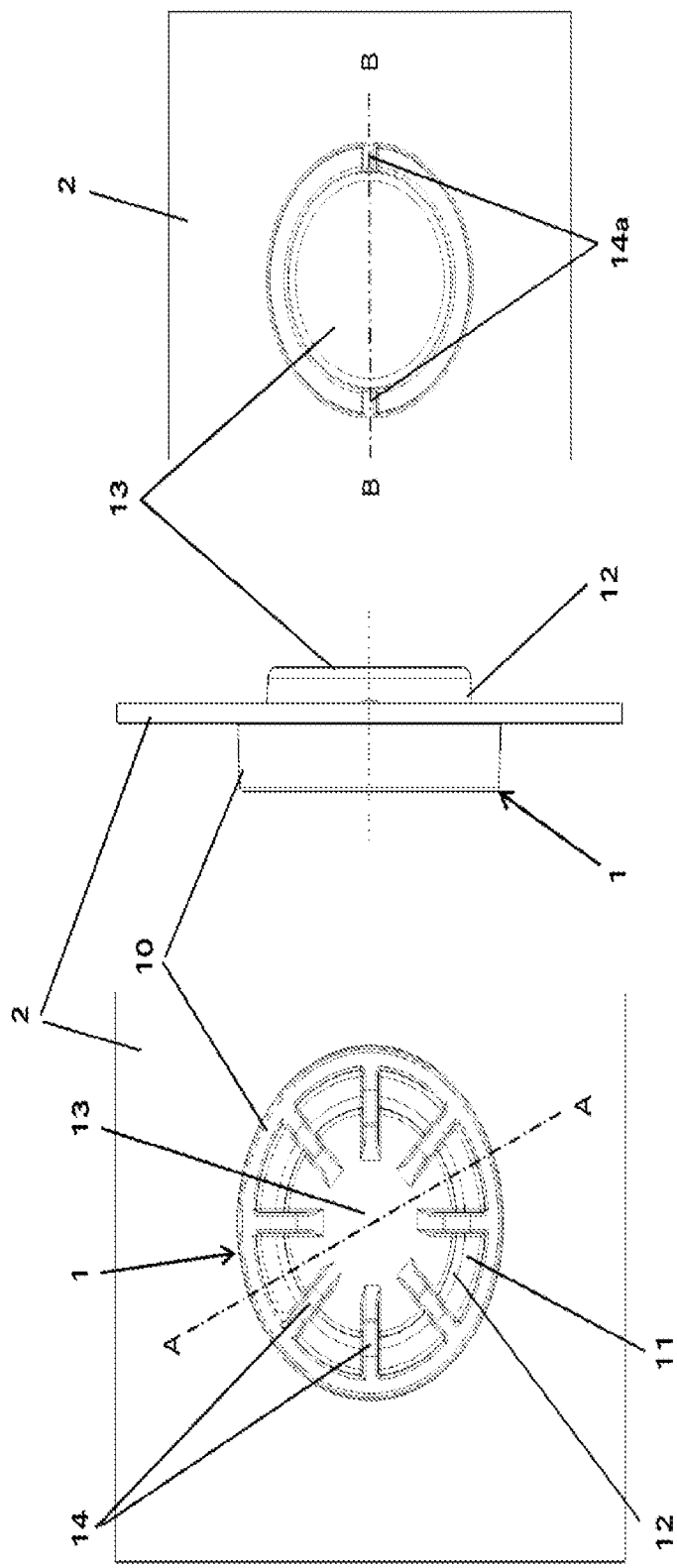

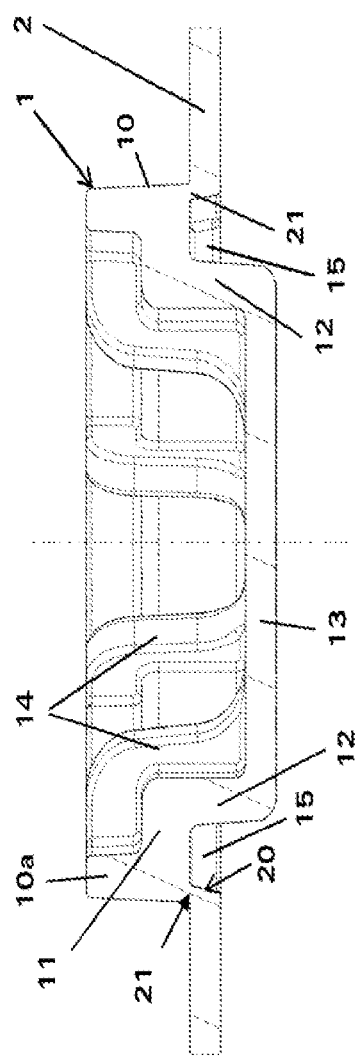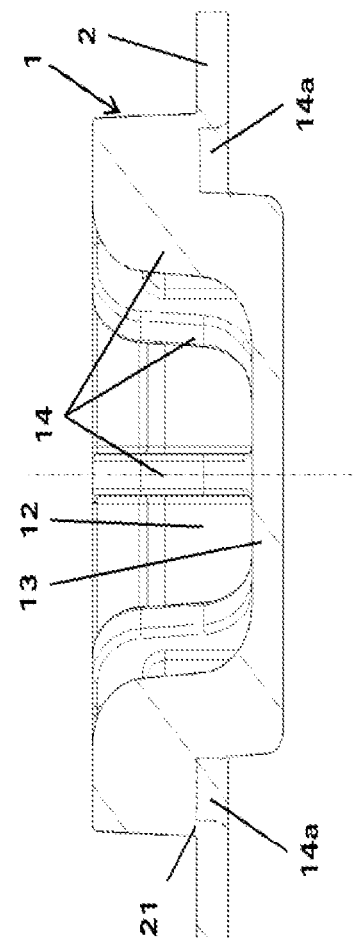

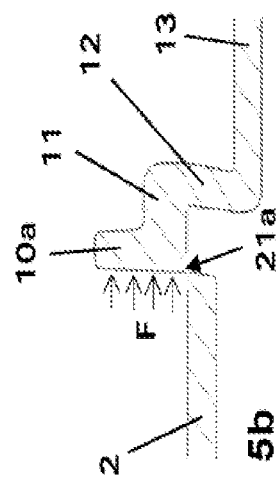
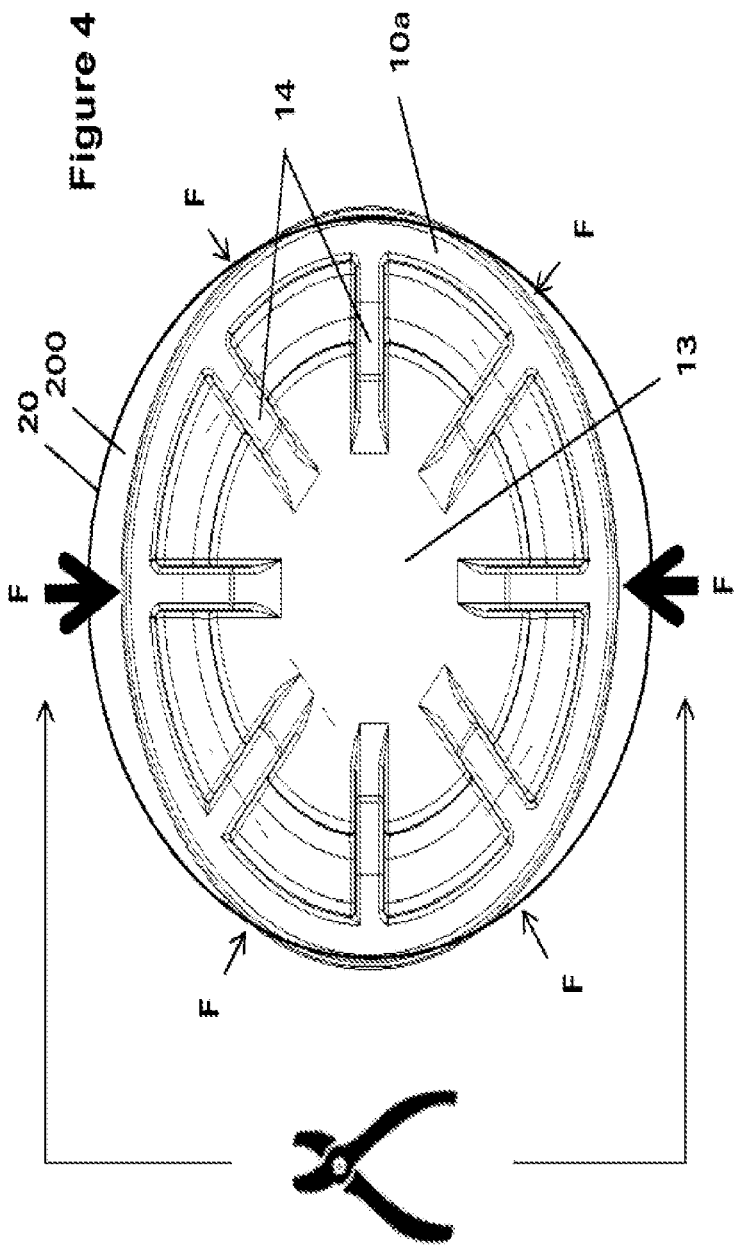
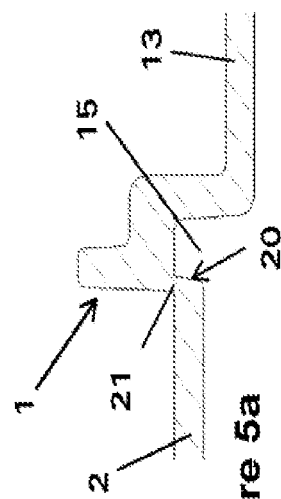

BREAK-OUT ELEMENT FOR A MODULE SUPPORT, WHICH IS DESIGNED AS A WET/DRY AREA SEPARATION, OF A DOOR OR FLAP OF A MOTOR VEHICLE

CROSS-REFERENCE TO A RELATED APPLICATIONS

This application is a National Phase Patent Application of International Patent Application Number PCT/EP2017/067997, filed on Jul. 17, 2017, which claims priority of German Patent Application Number 10 2016 008 728.5, filed on Jul. 21, 2016, the entirety of both of which are incorporated herein by reference.

BACKGROUND

The disclosure relates to a break-out element for a module support, which is designed as a wet/dry area separation, of a door or flap of a motor vehicle. The break-out element according to the solution ensures simple and secure access for a tool when required, for example in order to separate a windowpane from a window opener mechanism.

DE 10 2005 033 116 A1 discloses a break-out element of the type in question which has an annularly encircling region of weakness. Said partial portion of a unit support enclosed by the region of weakness can be broken out by action of force in order to thereby open up a service opening.

Although this technical solution is extremely simple, it also has disadvantages. Due to the absence of defined handling elements, the service opening can be broken free in a manner only controlled to a limited extent by means of a tool, for example a screw driver. This can lead to inadvertent damage of parts located there behind. Furthermore, the broken-out part could drop into the wet area, which would necessitate complicated removal of the unit support if rustling noises are to be reliably avoided during the journey. Since only comparatively little force can therefore be applied in order to break out the part closing the service opening, the region of weakness has to be provided with a particularly thin material wall thickness. This in turn conceals the risk of the regions of weakness themselves or the region enclosed by them no longer being sufficiently supplied with plastics melt during the injection molding process of the unit support. The tightness of the unit support would thereby no longer be ensured.

Similar technical solutions are known from DE 198 24 130 A1 and DE 103 60 794 A1, in which predetermined breaking ports are provided in a sheet metal component or a unit support. Upon breaking of the predetermined breaking points, openings which can serve as installation openings or for components to reach through are opened up.

Furthermore, DE 10 2011 116 134 A1 and DE 20 2004 020 237 U1 discloses predetermined breaking points which can be broken open via a screwing tool to be attached.

SUMMARY

The problem underlying the proposed solution is to eliminate the disadvantages mentioned above, but without having to change the injection molding process or make recourse to an injection mold with sliders.

According to the solution, the break-out element is in the form of a cup, wherein the region of weakness supporting said cup is arranged between the free edge of an edge-side cup ring and the base of the cup. In this case, at one end, the edge-side cup ring protrudes over that side of the module support which faces the wet area and, at the other end, the base-side cup ring protrudes over that side of the module support which faces the dry area. However, should the region of weakness be arranged outside the base plane of the module support, that which has been described above applies analogously.

That region of the cup-shaped break-out element which protrudes over the module support and contains the edge-side cup ring is configured here in such a manner that said region is suitable as an actuating ring for the access of a tool, in particular a pair of pliers. The engagement surface of the actuating ring can be smooth or grooved. In order to be able to avoid a special tool for the break-out element, the outer dimensions of said break-out element should be reduced to a minimum of the size of the service opening to be produced and should lie within a region which can be entered by conventional pairs of pliers or the like.

The break-out element can be broken out in a simple manner in that pressure is exerted on the actuating ring by a pair of pliers until the material in the region of weakness yields and the break-out element is detached in this region from the module support. By repositioning the pair of pliers on regions which have not yet been detached, the break-out element is gradually detached from the module support in the circumferential direction.

When a circular, rotationally symmetrical or another polygon-like symmetrical contour of a substantially cup-like break-out element is used, it is virtually impossible for the break-out element to inadvertently drop into the wet space. Furthermore, the cup shape according to the solution ensures that the break-out element can be detached from the module support with a readily meterable force, which also helps to avoid damage to the edge of the service opening.

Even more important, however, is the advantage that the possibility of the targeted use of comparatively high forces also enables the wall thickness of the regions of weakness designed as a predetermined breaking point to be thicker. It can thereby always be ensured that the regions of weakness and the wall enclosed by them are completely sprayed by plastic and are therefore watertight.

In particular in the event of having to apply comparatively high break-out forces, a stabilization of the actuating ring provided for the tool (pair of pliers) is expedient. Instead of a greater wall thickness, radially oriented stiffening ribs are arranged on the inner side of the cup. Such a rib structure ensures that the actuating force is actually transmitted to the region of weakness of the predetermined breaking point and that the actuating ring is not imploded in the process.

In connection with the rib structure and the attachment of the break-out element to the module support via the region of weakness, it is also advantageous to select a cup shape of step design. In this case, the edge-side cup ring of the cup-shaped contour of the break-out element is adjoined by a radially inwardly projecting step which merges into a base-side cup ring of smaller diameter. The attachment of the cup to the module support accordingly takes place via the region of weakness on the outer edge of the actuating ring which converges with the contour of the step which connect the edge-side cup ring of greater diameter when the base-side cup ring of smaller diameter.

In the event that the region of weakness is intended to be of comparatively thin-walled design and because of this the region bordered by said region of weakness cannot be reliably supplied with plastics melt, an additional flow region for the transport of the plastics melt is intended to be provided between the cup and the module support, preferably between at least one of the stiffening ribs and the module support. Said additional web serving exclusively for the transport of the plastics melt only insignificantly increases the necessary break-out force.

At this point, it should once again be emphasized that the main contour of the cup can differ from the rotational symmetry of a substantially circular cup without diminishing the essential advantages according to the solution. Contours of this type can resemble the contour of an ellipse or of a square with rounded corners or of a different, substantially convexly contoured polygon with a polygonal contour.

The solution will be described in more detail below with reference to an embodiment and the figures below.

BRIEF DESCRIPTION OF THE DRAWINGS

FIG. 2a shows a top view of the break-out element according to FIG. 1 from the dry area side.

FIG. 2b shows the side view of the break-out element according to FIG. 1 with a module support.

FIG. 2c shows a top view of the break-out element according to FIG. 1 from the wet area side.

FIG. 3a shows a sectional illustration of the break-out element between the ribs.

FIG. 3b shows a sectional illustration of the break-out element through two opposite ribs and flow regions placed there with the plastics melt.

FIG. 4 shows a top view of a break-out element which is deformed and is thereby partially detached from the module support.

FIG. 5a shows a sectional illustration of a detail of break-out element and module support in the region of the predetermined breaking point (region of weakness) before tearing.

FIG. 5b shows a sectional illustration of break-out element and module support in the region of the predetermined breaking point (region of weakness) at the moment of tearing.

DETAILED DESCRIPTION

Figure 1:
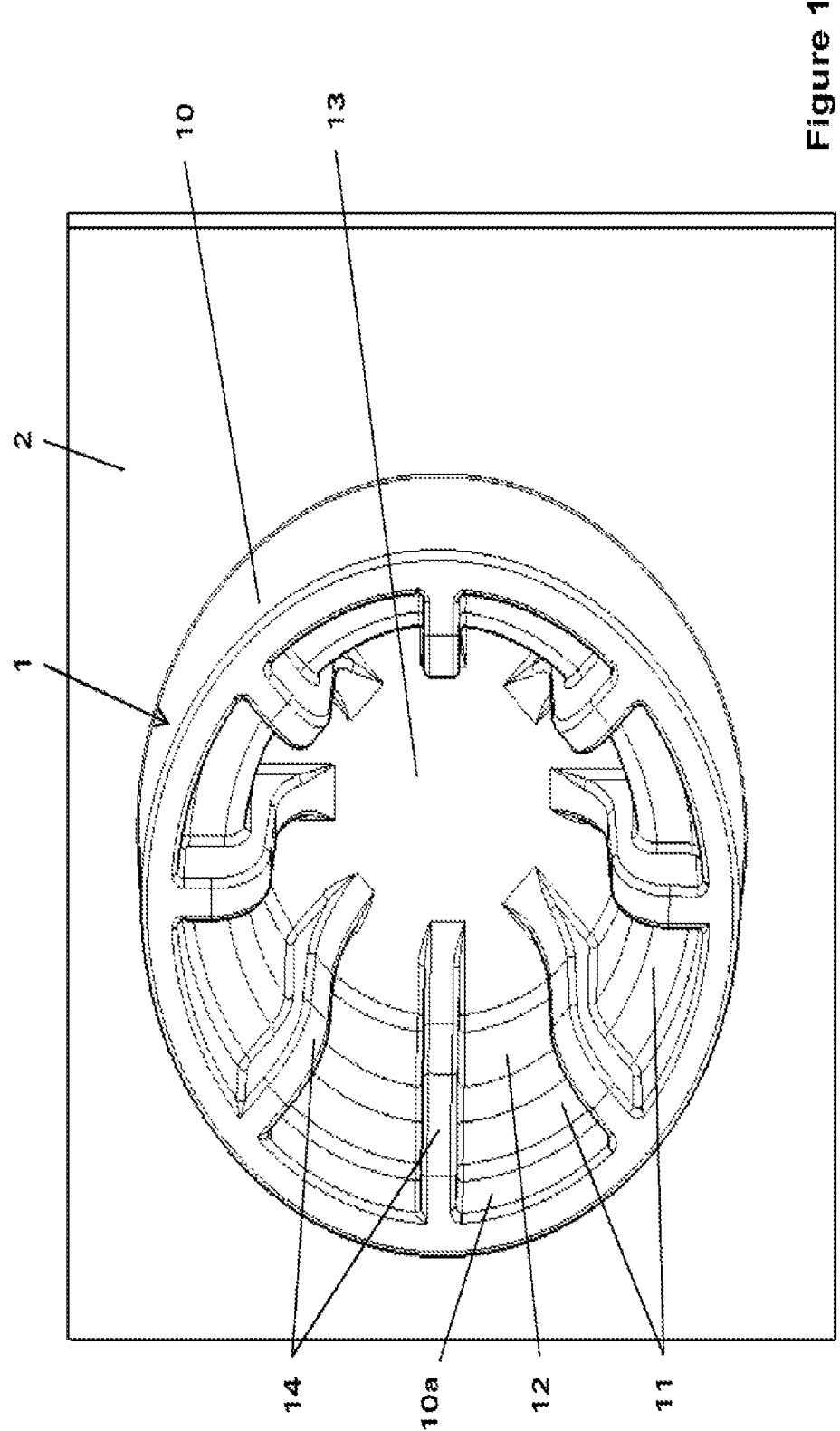
FIG. 1 shows a perspective illustration of a break-out element integrated integrally in a base (module support).

The break-out element 1 which is illustrated in FIG. 1 and is integrated in the module support 2 has a rotationally symmetrical structure (apart from its stiffening ribs 14 lying inside the cup). As a result, a tool, preferably a pair of pliers, can be attached as desired to the outer contour in order to break out the break-out element at the outer structure formed by the actuating ring 10. The stiffening ribs 14 first of all provide the actuating ring with sufficient strength necessary for the transmission of the tearing forces in the region of weakness 21. Secondly, the radially oriented ribs 14 ensure that the break-out element 1 can be sufficiently deformed from the dry area side.

In order to be able to transmit the force necessary for separating the break-out element in a safe and easily handleable manner even in the case of thicker wall thicknesses in the region of the predetermined breaking point (region of weakness 21), a multi-stage, in particular two-stage cup contour has proven successful. In this case, the edge-side cup ring 10a of the cup-shaped contour is adjoined by a radially inwardly projecting step 11 which merges into a base-side cup ring 12 of smaller diameter. The base-side cup ring 12 finally ends in the base 13 of the cup contour, wherein the base 13 protrudes over the adjacent plane of the module support 2 in the direction of the wet area side. This configuration can thus be seen in the overall view of FIGS. 2a to 3b.

In the case of the two-stage, cup-shaped design of the break-out element 1 that is illustrated, it is particularly advantageous if the region of weakness 21 and therefore the attachment of the cup 1 to the module support 2 takes place at the outer edge of the actuating ring 10 which converges with the contour of the step 11. A channel 15 which runs in the circumferential direction is therefore formed, the channel providing the freedom of movement necessary for the flexing deformation of that region of the break-out element 1 which is located above the base 13.

According to the present embodiment (see FIG. 2b in conjunction with FIGS. 3a and 3b), the encircling channel 15 is interrupted in the planes by two ribs 14 and is therefore directly connected to the adjacent module support 2. These connections constitute flow regions 14a through which the plastics melt can flow for building up the structure of the break-out element 1. Flow regions of this type are especially expedient whenever plastics melts having high fiber content and limited flowability are used, for which the very thin-walled region of weakness 21 would be possible only with difficulty.

FIG. 4 schematically shows how, under the action of radially acting actuating forces F, the break-out element 1 has been detached at the upper and lower edge such that parts of the hole edge 20 of the module carrier 2, including a sickle-shaped hole opening, already become visible. With manual repositioning of the pair of pliers and action on the lateral regions of the break-out element 1, the connections still remaining would be detached from the module support 2 and the break-out element could be removed in order to open up the service opening 200.

The schematic sectional illustrations of FIGS. 5a and 5b show the region of weakness 21 before the action of a radial tearing-off force and during the action of the tearing-off force at the moment of the tearing off of the relevant cup-shaped region 1 from the module support 2, wherein the material in the region of weakness is subjected above all to a shearing stress.

LIST OF REFERENCE SIGNS

1 Break-out element; cup
10 Actuating ring
10a Edge-side cup ring
11 Step
12 Base-side cup ring
13 Base
14 Rib
14a Flow region for plastics melt
15 Channel
2 Module support
20 Hole edge
21 Region of weakness (predetermined breaking point)
200 Hole opening
F Actuating force (radially acting)

The invention claimed is:
1. A break-out element for a module support, which is designed as a wet/dry area separation, of a door or flap of a motor vehicle, wherein the break-out element is integrally connected to the adjacent material of the module support via at least one region of weakness of lesser material thickness, and wherein the region of weakness acts as a predetermined breaking point and forms at least part of the edge of an access opening,
wherein the break-out element is in the shape of a cup, wherein the region of weakness is arranged between the free edge of an edge-side cup ring and the base of the cup.

2. The break-out element as claimed in claim 1, wherein that region of the cup-shaped break-out element which protrudes over the module support is designed as an actuating ring in such a manner that the latter provides an engagement surface suitable for a tool.

3. The break-out element as claimed in claim 1, wherein the edge-side cup ring of the cup-shaped contour of the break-out element is adjoined by radially inwardly projecting step which merges into a base-side cup ring of smaller diameter.

4. The break-out element as claimed in claim 1, wherein the base-side cup ring at least partially protrudes beyond the adjacent plane of the module support in the direction of the wet area side.

5. The break-out element as claimed in claim 3, wherein the region of weakness and therefore the attachment of the cup to the module support takes place at the outer edge of the actuating ring which converges with the contour of the step, wherein a channel is formed which is bounded
by an inner hole edge of the module support
by a wall of the step facing the wet area side, and
by an outwardly facing wall of the base-side cup ring.

6. The break-out element as claimed in claim 1, wherein a stiffening structure formed from radially directed ribs is arranged in the interior of the cup.

7. The break-out element as claimed in claim 1, wherein an additional flow region for the transport of the plastics melt is provided between the cup and the module support.

8. The break-out element as claimed in claim 7, wherein the additional flow region for the transport of the plastics melt is provided between at least one rib and the module support.

* * * * *